United States Patent

Pan et al.

[11] Patent Number: 6,155,920
[45] Date of Patent: Dec. 5, 2000

[54] AIR DUCTS STRUCTURE OF A RADIATING FAN

[75] Inventors: Chien-Hua Pan, Tao Yuan Hsien; Din-Kuo Chang, Taipei, both of Taiwan

[73] Assignee: Lite-On Enclosure Inc., Taipei, Taiwan

[21] Appl. No.: 09/215,231

[22] Filed: Dec. 18, 1998

[51] Int. Cl.[7] ...................................................... B05B 7/20
[52] U.S. Cl. ........................... 454/184; 361/695; 454/313
[58] Field of Search .................................... 454/184, 155, 454/313; 361/695

[56] References Cited

U.S. PATENT DOCUMENTS

| | | | |
|---|---|---|---|
| 1,596,900 | 8/1926 | Stacey, Jr. ................................ | 454/313 |
| 5,734,552 | 3/1998 | Krein ....................................... | 361/695 |
| 5,917,698 | 6/1999 | Viallett ................................... | 361/695 |

FOREIGN PATENT DOCUMENTS

| | | | |
|---|---|---|---|
| 61-66042 | 4/1986 | Japan ...................................... | 454/313 |
| 222343 | 10/1924 | United Kingdom ................... | 454/313 |

*Primary Examiner*—Harold Joyce
*Attorney, Agent, or Firm*—Rosenberg, Klein & Lee

[57] ABSTRACT

An air duct of a radiating fan having an air duct body and guide plates installed within the air duct body. A plurality of positioning holes with special arrangement are installed on the periphery of the wind outlet of air duct body. The front and rear sides of the guide plate are installed with pivotal pins. Thereby, the guide plate can be buckled to respective positioning holes so to form different angles with the air duct body. Therefore, the orientation and size of the channel of air flow is changed. As consequence, the guide plates can be installed on the wind outlet of the radiating fan of an electronic device and the airflow actually attains the predetermined place and the heat dissipating efficiency is increased.

3 Claims, 6 Drawing Sheets

AIR DUCTS STRUCTURE OF A RADIATING FAN

BACKGROUND OF THE INVENTION

1. Field of the Invention

The present invention relates to an air duct structure, and especially to an air duct of a radiating fan which can be installed on the wind outlet of an electronic device and can concentrate or guide airflow to the electronic device in the periphery thereof.

2. Description of the Prior Art

In the general computer mainframe, because of the variation of voltage or accumulation of circuits and components, the temperatures of some electronic devices or components are increased to a high value so as to destroy itself or other adjacent components. Generally, electronic devices or components easy generating high temperature are added with radiator. The most frequently used radiator is radiating fan. The components most easily accumulating a high thermal power are power supplies in addition to CPUs (central processing unit). Therefore, in general, the power supplies and CPUs are installed with radiating fan.

For the radiating fans of power supply, in conventional, the air flows to the casing. Thus, only the waste gas from the voltage change is released. However, in recent computer systems, in order to increase the energy efficiency, in the newly design, the air flows into the casing for generating air convection so that other electronic device without radiator has the function of heating dissipating by the radiating fan. However, since in the prior art, the air flows uniformly and inwards, and thus it can not be concentrated to some predetermined and important places, a part of air flows to places without any electronic devices. While some electronic devices necessarily dissipating heat get no air. Therefore, the heat dissipating efficiency is not good.

Accordingly, it is not necessary to have a novel radiating fan in which the orientation and amount of air flow can be adjusted so to increase the heat dissipating efficiency.

SUMMARY OF THE INVENTION

Accordingly, the object of the present invention is to provide an air duct of a radiating fan. The air duct includes an air duct body and guide plates installed within the air duct body, which may be orientated to the required angle as desired. A plurality of positioning holes with special arrangement is installed on the periphery of the wind outlet of air duct body. The front and rear sides of the guide plates are installed with pivotal pins. Thereby, the guide plates can be buckled to respective positioning holes so to form different angles with the air duct body. Therefore, the orientation and size of the channel of airflow are changed. Thereby, the guide plate can be installed on the wind outlet of the radiating fan of an electronic device. Thus, the airflow actually attains the predetermined place and the heat dissipating efficiency is increased.

The present invention will be better understood and its numerous objects and advantages will become apparent to those skilled in the art by referencing to the following drawings in which:

DETAILED DESCRIPTION OF THE PREFERRED EMBODIMENT

Referring now to FIGS. 1 to 6, the air duct of a radiating fan of the preferred embodiment in the present invention is disclosed. The air duct of the radiating fan in the present invention includes an air duct body 1 and at least one guide plate 2.

Figure 1:
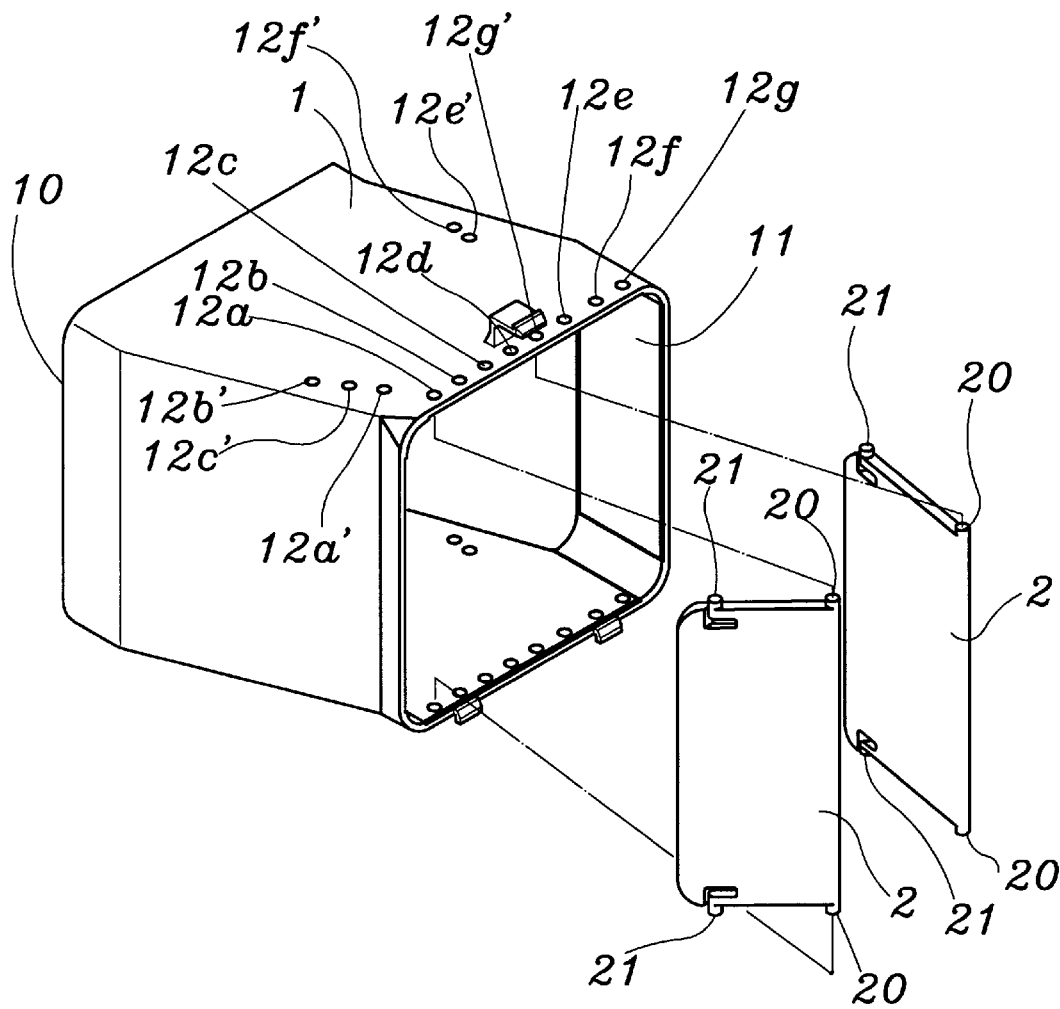
FIG. 1 is an exploded perspective view of the present invention.
Figure 2:
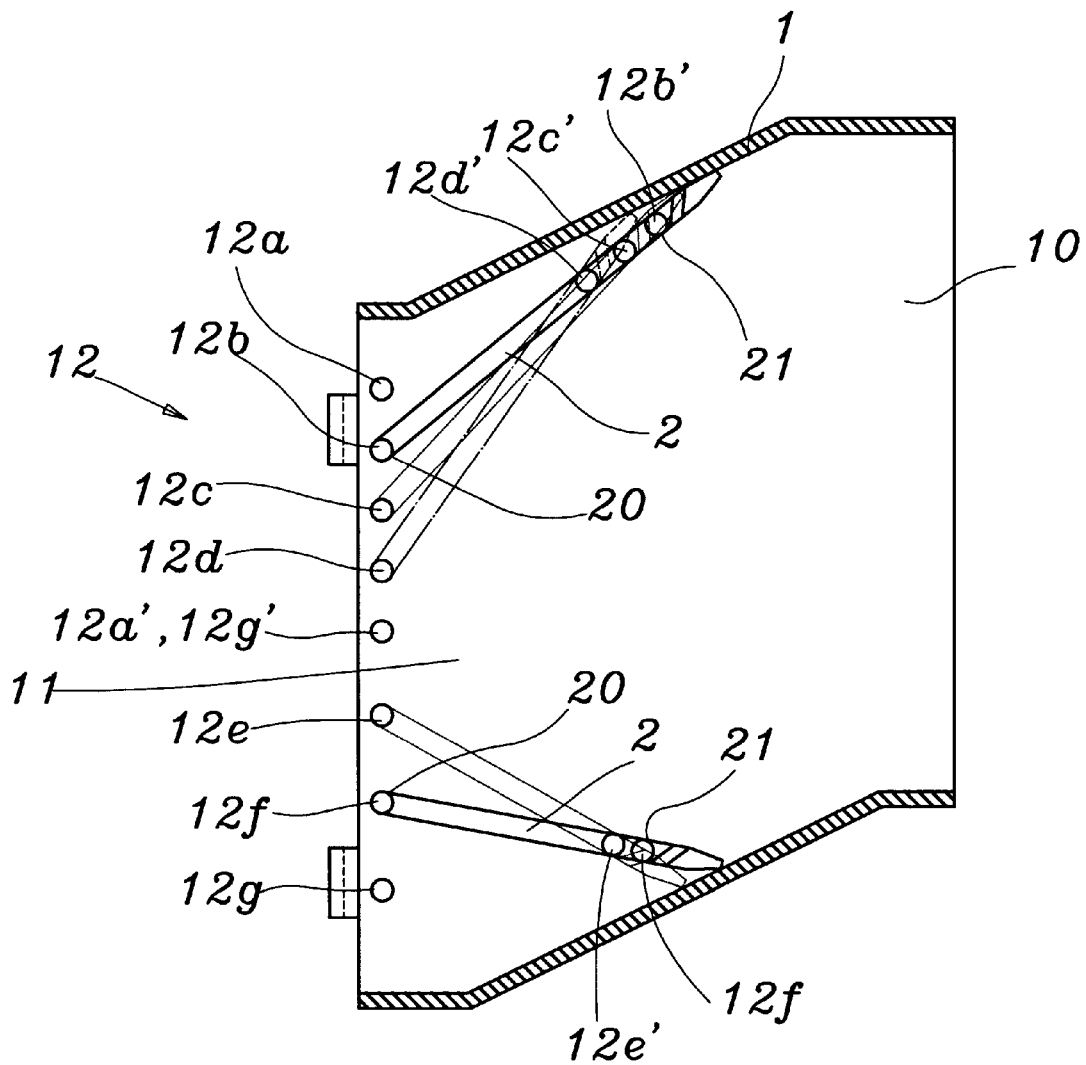
FIG. 2 is a lateral cross sectional view showing the structure of the present invention.
Figure 3:
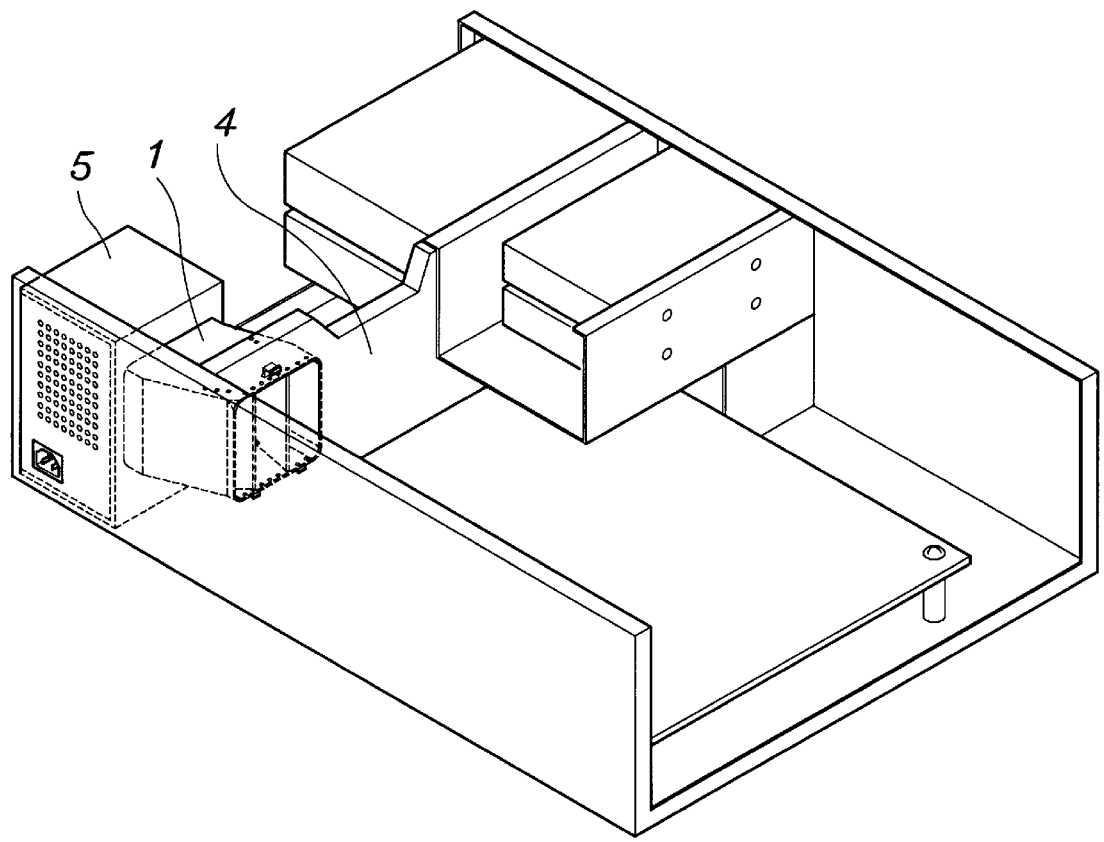
FIG. 3 is a schematic view showing an embodiment of the first application of the present invention.
Figure 4:
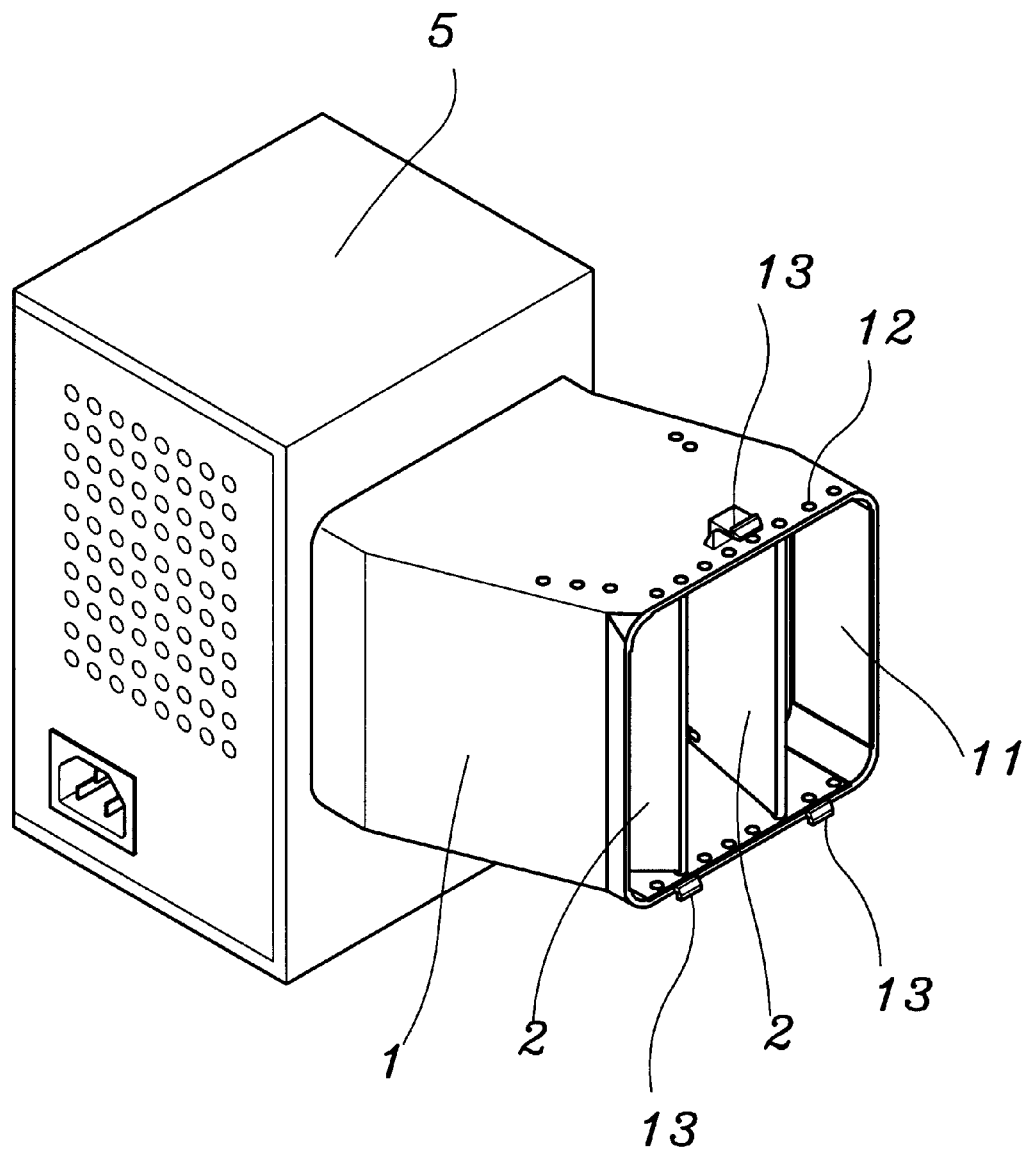
FIG. 4 is a partial perspective view of FIG. 3.
Figure 5:
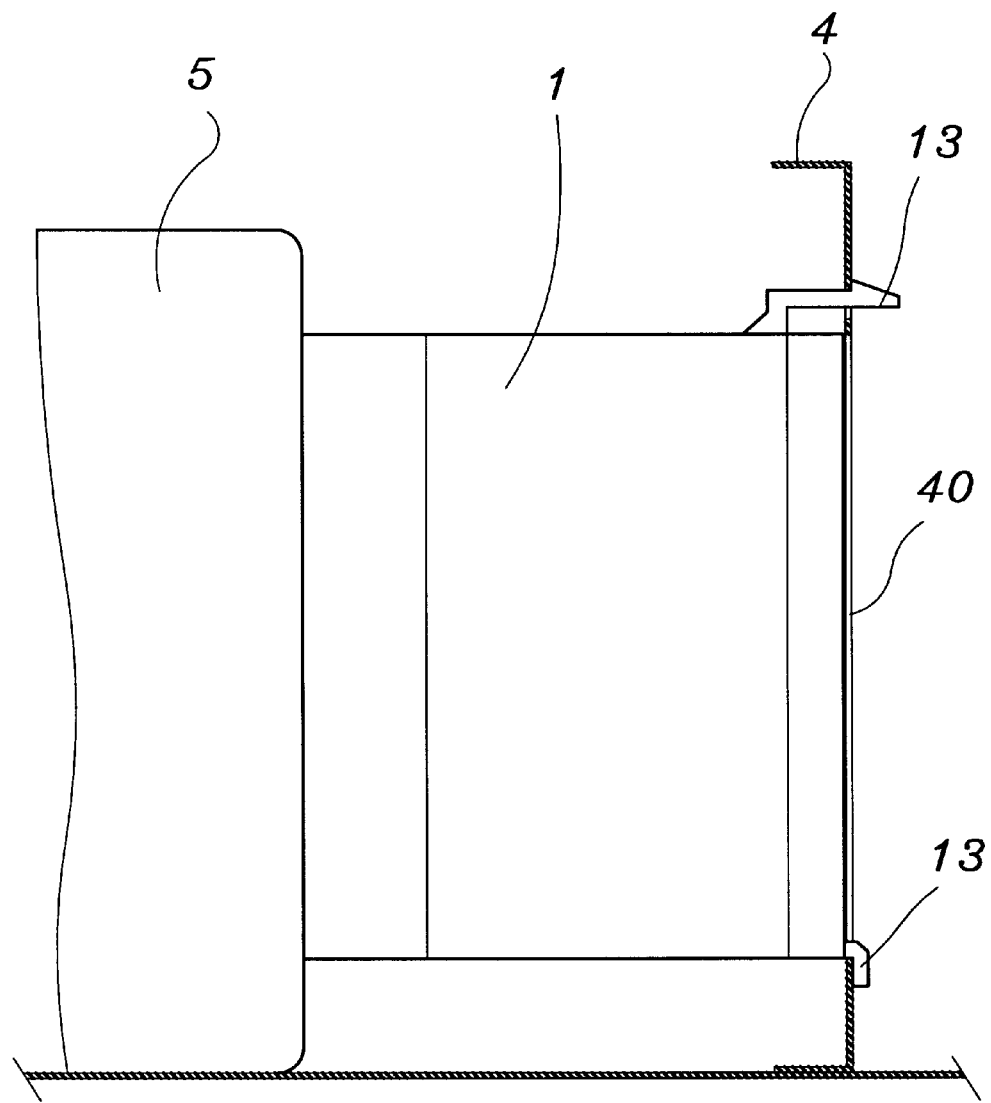
FIG. 5 is a lateral cross sectional view of FIG. 3.

As shown in FIGS. 1 and 2, the air duct body 1 is a hollow frame structure and includes a wind inlet 10 and a wind outlet 11. The periphery of the wind outlet 11 is formed with a plurality of positioning holes 12. The positioning holes are arranged according to the width of the front pivotal pins 20 and the rear pivotal pins 21. Namely, for each first pair of positioning holes 12, at least one second pair of positioning holes 12 may be searched within the area around the first positioning holes 12 with a radius equal to the distance between the pivotal pin 20 and the pivotal pin 21. That is, when the two pivotal pins 20 in front of the guide plate is pivotally installed on the two paired positioning holes of the air duct body 1, the rear two paired pivotal pins 21 will search another two paired positioning holes to be engaged therewith so that a predetermined angle is formed between the guide plate 2 and the air duct body 1 to form an channel of air flow with a predetermined shape. For example, the positioning hole 12*a* in the FIG. 2 has a paired positioning hole 12*a'*; the positioning hole 12*b* has paired positioning hole 12*b'*; the positioning hole 12*c* has a paired positioning hole 12*c'*; the positioning hole 12*d* has a paired positioning hole 12*d'*; the positioning hole 12*e* has a paired positioning hole 12*e'*; the positioning hole 12*f* has a paired positioning hole 12*f'*; and the positioning hole 12*g* has a paired positioning hole 12*g'* (i.e. positioning hole a').

Figure 6:
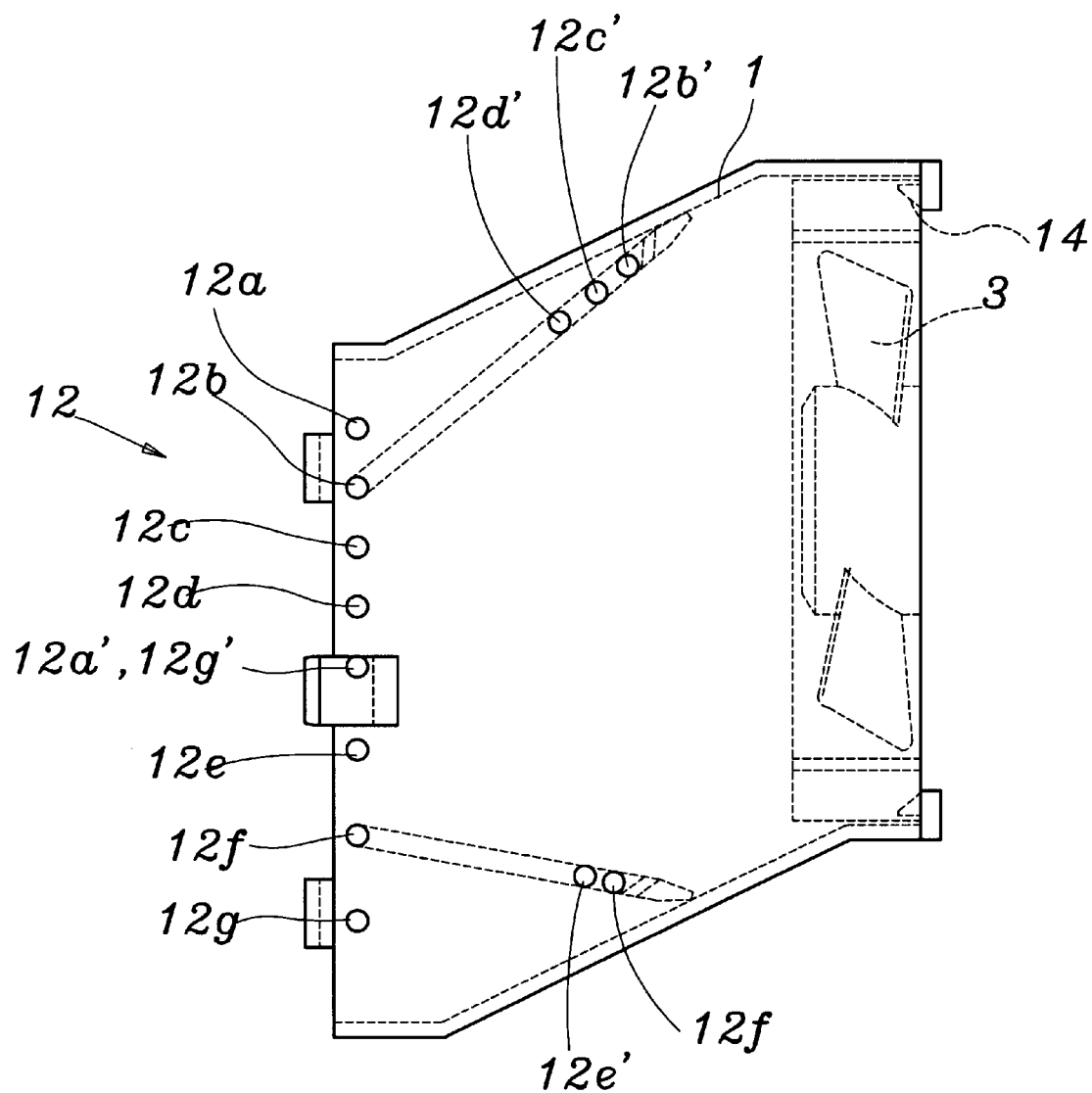
FIG. 6 is a schematic view showing the second application of the present invention.

Therefore, air flows with different speeds and directions can be generated by the guide plate 2 engaged within different positioning holes 12. Thus, the whole air duct can be installed with or adjacent to the radiating fan 3 of a specific electronic device (such as power supply) or a single radiating fan. As shown in FIGS. 3 to 6, the invention has various installation ways according to the arrangement of the components within the computer mainframe. For example, the present invention may be used within the mainframe with a spacer 4. Namely, a hook 13 is formed on the periphery of the wind outlet 11 to engage with the buckling hole 40 formed on the spacer 4. In another example, as shown in FIG. 6, the present invention is employed in a mainframe without any spacer. Namely, a hook 14 is formed on the periphery of the wind inlet 10 of the air duct body 1 to be directly buckled to the radiating fan 13 or an electronic device 5. Thereby, the adjusting the orientation of the guide plate 2, the air flow from the radiating fan 3 will be guided to a predetermined direction or to an electronic device 5 generating much heat. Therefore, the radiating fan 3 not only radiates heat by itself, but also can effectively dissipate heat by a well designed air flow. Therefore, the heat dissipation efficiency of the present invention is superior than that in the prior art.

In summary, the air duct of a radiating fan in the present invention attains many functions of heat dissipation and is actually a novel invention. Although the present invention has been described using specific embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. A reconfigurable air duct assembly for guiding airflow generated by a fan system comprising:

(a) an air duct body having an open inlet end, an open outlet end, and a wall section defining an air channel extending therebetween for guiding the airflow, said wall section having first and second wall portions offset one from the other across said air channel, said first and second wall portions having respectively formed therein adjacent at least one said inlet and outlet ends a plurality of first and second positioning holes, and, (b) at least one guide plate coupled to said air duct body in selectively relocatable and angularly adjustable manner for adjustably deflecting the airflow in said air channel, said guide plate extending into said air channel and having a front pair of pivotal pins formed at opposed ends thereof and a rear pair of pivotal pins formed at opposed ends thereof, said front pair of pivotal pins releasably engaging a first preselected pair of said first and second positioning holes, said second pair of pivotal pins releasably engaging a second preselected pair of said first and second positioning holes.

2. The reconfigurable air duct assembly as recited in claim 1 wherein said air duct body includes at least one hook member protruding from said wall section adjacent said outlet end.

3. The reconfigurable air duct assembly as recited in claim 1 wherein said air duct body includes at least one hook member protruding from said wall section adjacent said inlet end for engaging the fan system.

\* \* \* \* \*